(12) United States Patent
White et al.

(10) Patent No.: US 7,988,766 B2
(45) Date of Patent: Aug. 2, 2011

(54) METAL OXIDE SYSTEM FOR ADSORBENT APPLICATIONS

(75) Inventors: James H. White, Boulder, CO (US); Jesse W. Taylor, Westminister, CO (US)

(73) Assignee: Eltron Research & Development Inc., Boulder, CO (US)

( * ) Notice: Subject to any disclaimer, the term of this patent is extended or adjusted under 35 U.S.C. 154(b) by 278 days.

(21) Appl. No.: 12/257,811

(22) Filed: Oct. 24, 2008

(65) Prior Publication Data

US 2009/0134008 A1    May 28, 2009

Related U.S. Application Data

(60) Provisional application No. 60/983,113, filed on Oct. 26, 2007.

(51) Int. Cl.
*B01D 53/04* (2006.01)
(52) U.S. Cl. .............. 95/128; 95/134; 95/139; 95/140; 95/144; 95/148; 96/153; 423/247; 502/400
(58) Field of Classification Search .................. 210/660, 210/661, 670, 679; 96/108, 153; 95/128, 95/134, 139, 140, 144, 148; 423/210, 230, 423/237, 239.1, 245.1, 247; 502/60, 400; 585/820
See application file for complete search history.

(56) References Cited

U.S. PATENT DOCUMENTS

| | | | |
|---|---|---|---|
| 4,265,768 A | 5/1981 | Beasley et al. | |
| 4,337,156 A * | 6/1982 | deRosset | 210/672 |
| 4,869,735 A | 9/1989 | Miyazawa et al. | |
| 4,917,875 A | 4/1990 | Moore et al. | |
| 5,242,673 A | 9/1993 | Flytzani-Stephanopoulos et al. | |
| 5,245,099 A | 9/1993 | Mitariten | |
| 5,439,868 A | 8/1995 | Onitsuka et al. | |
| 5,451,248 A * | 9/1995 | Sadkowski et al. | 95/99 |
| 5,458,861 A | 10/1995 | Buchanan et al. | |
| 5,591,417 A | 1/1997 | Buchanan et al. | |
| 5,591,418 A | 1/1997 | Bhattacharyya et al. | |
| 5,645,700 A | 7/1997 | White et al. | |
| 5,687,565 A | 11/1997 | Modica et al. | |
| 5,750,020 A | 5/1998 | Bhattacharyya et al. | |
| 5,884,473 A | 3/1999 | Noda et al. | |
| 5,916,129 A | 6/1999 | Modica et al. | |
| 6,033,632 A | 3/2000 | Schwartz et al. | |
| 6,214,757 B1 | 4/2001 | Schwartz et al. | |
| 6,258,334 B1 * | 7/2001 | Gadkaree et al. | 423/210 |
| 6,281,403 B1 | 8/2001 | White et al. | |
| 6,355,093 B1 | 3/2002 | Schwartz et al. | |
| 6,458,741 B1 | 10/2002 | Roark et al. | |
| 6,492,298 B1 * | 12/2002 | Sobukawa et al. | 502/325 |
| 6,572,681 B1 * | 6/2003 | Golden et al. | 95/122 |
| 6,592,782 B2 * | 7/2003 | MacKay et al. | 252/500 |
| 6,653,519 B2 | 11/2003 | Koper et al. | |
| 6,667,018 B2 | 12/2003 | Noda et al. | |
| 6,787,118 B2 | 9/2004 | Roark et al. | |
| 6,818,582 B2 | 11/2004 | Maunula | |
| 6,949,230 B2 | 9/2005 | Schwartz et al. | |
| 7,393,876 B2 | 7/2008 | White et al. | |
| 2003/0166987 A1 | 9/2003 | Roark | |

OTHER PUBLICATIONS

International Search Report and Written Opinion, Corresponding to International Application No. PCT/US 08/81086, Mailed Dec. 19, 2008.

* cited by examiner

*Primary Examiner* — Frank M Lawrence
(74) *Attorney, Agent, or Firm* — Greenlee Sullivan P.C.

(57) ABSTRACT

Provided herein are adsorbents and methods of using the adsorbents to at least partially remove one or more adsorbates. In an aspect, an adsorbate within a phase is at least partially removed by providing an adsorbent material and contacting the adsorbent material with the phase having an adsorbate, to at least partially remove the adsorbate. Various adsorbents are disclosed having the chemical formula $RE_{1-x-y-z}B_xB'_yB''_zO_w$, where RE is RE is a rare earth metal, B is a trivalent metal ion, B' is a transition metal ion or an alkaline earth element, B" is a transition metal ion, $0 \leq x \leq 0.25$, $0 \leq y \leq 0.95$, $0 \leq z \leq 0.75$, w is a number which results in charge balance, and $x+y+z<1$.

16 Claims, 3 Drawing Sheets

METAL OXIDE SYSTEM FOR ADSORBENT APPLICATIONS

CROSS-REFERENCE TO RELATED APPLICATIONS

This application claims the benefit of U.S. Provisional Application No. 60/983,113, filed Oct. 26, 2007, which is hereby incorporated by reference in its entirety to the extent not inconsistent with the disclosure herein.

STATEMENT REGARDING FEDERALLY SPONSORED RESEARCH OR DEVELOPMENT

This invention was made with government support under FA8651-04-C-0268, DMI-0231757, and 68-D-01-018 awarded by the Small Business Innovation Research Program. The government has certain rights in the invention.

BACKGROUND OF THE INVENTION

Adsorbents for a variety of purposes have been developed. These include carbon materials for organic species, alumina of various phases for acid gases and selected organics, silica adsorbents for water, natural and synthetic molecular sieves (including zeolites) for general adsorbent applications, and ion exchange resins for hydrocarbons and oxygenated organics as well as acids and bases. The use of metal oxide systems other than silica, alumina, and molecular sieves, while having appeared frequently in the literature, is much less prominent in commercial applications.

U.S. Pat. Nos. 6,787,118[15] and 6,458,741,[16] as well as U.S. Patent pub. no. 20030166987,[17] all by Roark, et al and commonly owned with the current application, teach materials and their use in selective destruction of CO, complete low temperature oxidation of volatile organic compounds, and destruction of organics in liquid media respectively. The materials taught are mixed metal oxides containing rare earth (Ce, La, or Gd) and transition metal oxides. In addition, the process and materials taught[1] by Flytzani-Stephanopolous, et al in U.S. Pat. No. 5,242,673 are relevant. The materials, based on cerium oxide, are employed in a catalyst for the reduction of sulfur dioxide to sulfur using a reducing gas (e.g., CO). Materials disclosed herein, in contrast, contain a greater variety of elements and are not employed in a sulfur conversion process. An adsorbent catalyst containing Ce, Zr (or Ti), and Mn and other combinations of elements for capturing and destroying nitrogen oxides, hydrocarbons, and carbon monoxide is taught by Maunula in U.S. Pat. No. 6,818,582.[2] U.S. Pat. No. 6,667,018, by Noda, et al, teaches a catalyst-adsorbent for purification of exhaust gases which can include a heat-resistant metal oxide based on a rare earth metal. Those materials, however, lack the multiplicity of species and functions or the materials of the present invention. Reactive metal hydroxide and metal oxide nanoparticles are taught by Koper, et al[4] in U.S. Pat. No. 6,653,519. A rare earth metal is one such component of these materials. However, those materials are generally employed as disposable adsorbents or sorbents, in contrast to the adsorbent materials of the present invention. A method for reducing exhaust emissions from internal combustion engines is described in U.S. Pat. Nos. 5,916,129 and 5,687,565, by Modica, et al.[5,8] Those patents disclose a sulfur oxide adsorbent which is comprised of an alkaline earth or zinc oxide along with a main group or transition metal oxide, or a rare earth metal oxide. U.S. Pat. No. 5,884,473, by Noda, et al,[6] describes an adsorbent system for removal of nitrogen dioxide and hydrocarbons from exhaust in which the adsorbent contains oxides of alkali, alkaline earth, transition metal, and rare earth metals. Bhattacharyya, et al,[7,9] in U.S. Pat. Nos. 5,750,020 and 5,591,418, disclose a metal oxide adsorbent comprised of a divalent metal (zinc or alkaline earth), a trivalent metal (including rare earths and transition metals), and vanadium, tungsten, or molybdenum. Materials disclosed and claimed herein, however, do not utilize such a combination of elements.

The combined removal of sulfur oxides, carbon monoxide, and nitrogen oxides from flue gas using an adsorbent which incorporates a cerium oxide promoter is disclosed in U.S. Pat. Nos. 5,591,417 and 5,458,861 by Buchanan, et al.[10,11] Onitsuka, et al, in U.S. Pat. No. 5,439,868 teaches an adsorbent for removal of nitrogen oxides from gas streams which is comprised of metal oxides and halides.[12] This is different from the disclosure herein in that metal halides are not employed as a constituent of the adsorbent. U.S. Pat. No. 4,917,875, by Moore, et al[13] teaches alumina supported rare earth compounds as adsorbents for the removal of sulfur oxides from gases utilizing as cyclic adsorption-desorption process. Again, the materials disclosed are different from those disclosed herein. U.S. Pat. No. 4,869,735, by Miyazawa, et al,[14] teaches a process utilizing an arsenic adsorbent which may contain oxides of alkaline earths transition metals, or main group elements. Disclosed herein, however, are adsorbents of markedly different composition.

SUMMARY OF THE INVENTION

An aspect of the present invention relates to an adsorbent comprised of materials of the general compositions: 1) $RE_{1-x-y-z}B_xB'_yB''_zO_w$ where RE is a rare earth metal that is Ce, Pr, Sm, Eu, Tb, Tm, or Yb; B is a trivalent metal ion that is Gd, Nd, Dy, Ho, Er, Lu, Sc, Y, La, Bi, Sb, In, Sn, Ga, or Al; B' is a transition metal ion that is Ti, Zr, V, Cr, Mn, Fe, Ru, Co, or Ni and/or an alkaline earth element that is Mg, Ca, Sr, or Ba; B'' is a transition metal ion that is Cu, Ag, or Zn; $0 \leq x \leq 0.25$, $0 \leq y \leq 0.95$, $0 \leq z \leq 0.75$; w is a number which results in charge balance, and $x+y+z<1$; 2) a zeolite exchanged with an ion of transition metal selected from Fe, Ni, Co, Ru, Mn, Zn, Cu, Ag, Cr, V, or Ti or with a mixture of these transition metal ions or with a mixture of one or more of these transition metal ions and an alkali metal ion selected from Li, Na, K, Rb, or Cs; or 3) a nanostructured material prepared by pyrolyzing a metal complex containing ligands incorporating both carbon and nitrogen in the pores of a porous inorganic material and a process employing them for removing chemical species from one phase and onto the surface or into pores or the bulk of the adsorbent material comprising another phase. Adsorbates include organic species such as CO, volatile organic compounds, polyaromatic hydrocarbons, heteroatomic species including organosulfides and organonitrogen compounds, metals, halogens ($Cl_2$, $Br_2$, and $I_2$), acid gases (e.g., HCl, sulfur oxides, nitrogen oxides, $CO_2$, etc.). The adsorbent material may be employed for this purpose in gas, vapor, liquid, and solid phases as well as slurries of solids in liquids or in beds of solids fluidized with gas, vapor, or liquid. In addition, the material and method employing it may be used with plasma systems. In this case the adsorbent is exposed to a plasma containing a mixture of species. The species possessing the greatest affinity for the adsorbent are adsorbed onto the material (e.g., the adsorbent), reducing the concentration of the species in the plasma and potentially resulting in its chemical transformation (e.g., complete oxidation).

In an aspect, the invention is directed to any of the adsorbent materials disclosed herein, including the specific compounds contained in any of the tables, any of the generic formulas disclosed herein as well as subsets thereof. In an aspect, any of the materials disclosed herein are used in a method to at least partially remove an adsorbate from a phase. "Phase" is used broadly herein and refers to any media in which an adsorbent is suspended, contained and/or located thereon. For example, the phase may comprise one or more of a stream of gas, liquid or vapor in which an adsorbent may be contained and conveyed. Similarly, phase also refers to a solid or plasma in which it is desired to remove or detect an adsorbent. Although any phase-adsorbent system is compatible with any of the methods disclosed herein, specific examples include, but are not limited to adsorbates that are an atomic material, a radical-containing material, a molecular species, a metal complex, a cluster ionic, a polymeric material, and a macromolecular material. Other examples of adsorbates of interest include, but are not limited to ethylene, ammonia, formaldehyde, carbon monoxide, carbon dioxide, hydrogen cyanide, ethylene, mercury, HCN, nitrogen containing compounds, amines, $H_2S$, organosulfides, and metals.

In an aspect, the method relates to an adsorbate that is a nitrogen-containing material, such as a nitrogen containing material in a naphtha liquid.

In an embodiment, the invention is a compound made by a process, such as a nanostructured material prepared by pyrolyzing a metal complex containing ligands and incorporating both carbon and nitrogen in the pores of a porous inorganic material wherein the metal is Ti, V, Cr, Mn, Fe, Co, Ni, Cu, Zn, Ru, Rh, Pd, Ag, Re, Os, Ir, Pt, or Au and the porous inorganic material is a zeolite or mesoporous inorganic material.

In another embodiment, the invention is an adsorbent material comprising a zeolite exchanged with an ion of transition metal selected from the group consisting of Fe, Ni, Co, Ru, Mn, Zn, Cu, Ag, Cr, V, Ti, a mixture thereof, and a mixture thereof with an alkali metal ion that is Li, Na, K, Rb, or Cs. In an aspect, the adsorbate is ethylene, ammonia, formaldehyde, carbon monoxide, or carbon dioxide; and the phase is a gas or a vapor stream.

Any of the methods disclosed herein optionally contain a regeneration step, wherein the adsorbent is exposed to a "regenerating parameter" that at least partially recharges the ability of an adsorbent to adsorb an adsorbate. Examples of regenerating parameters compatible with one or more methods disclosed herein include, but are not limited to, an increase in temperature under a fresh purge gas, a decrease in pressure under a fresh purge gas, rinsing with a fresh purge gas, rinsing with a fresh purge liquid, exposure to a reducing gas, exposure to an oxidizing gas, irradiation with ultrasonic waves and plasma bombardment.

In another aspect, the invention is optionally characterized by the surface area of the adsorbent that is exposed to the phase having an adsorbate. It may be desirable from a materials savings and efficiency aspect, to have a large area of adsorbent per gram mass of adsorbent, such as between 10 $m^2/g$ and 500 $m^2/g$.

Methods disclosed herein have a number of useful applications, including but are not limited to, removal of impurities from gas streams; deodorization of air and other gases; removal of ethylene from fruit, vegetable, and flower storage container air; removal of chemical warfare agents from ventilation air; purification of oxygen streams; isolation of specific molecules from plasmas; and separation of components of industrial, petroleum, petrochemical, and utility streams.

DETAILED DESCRIPTION OF THE INVENTION

Figure 1:
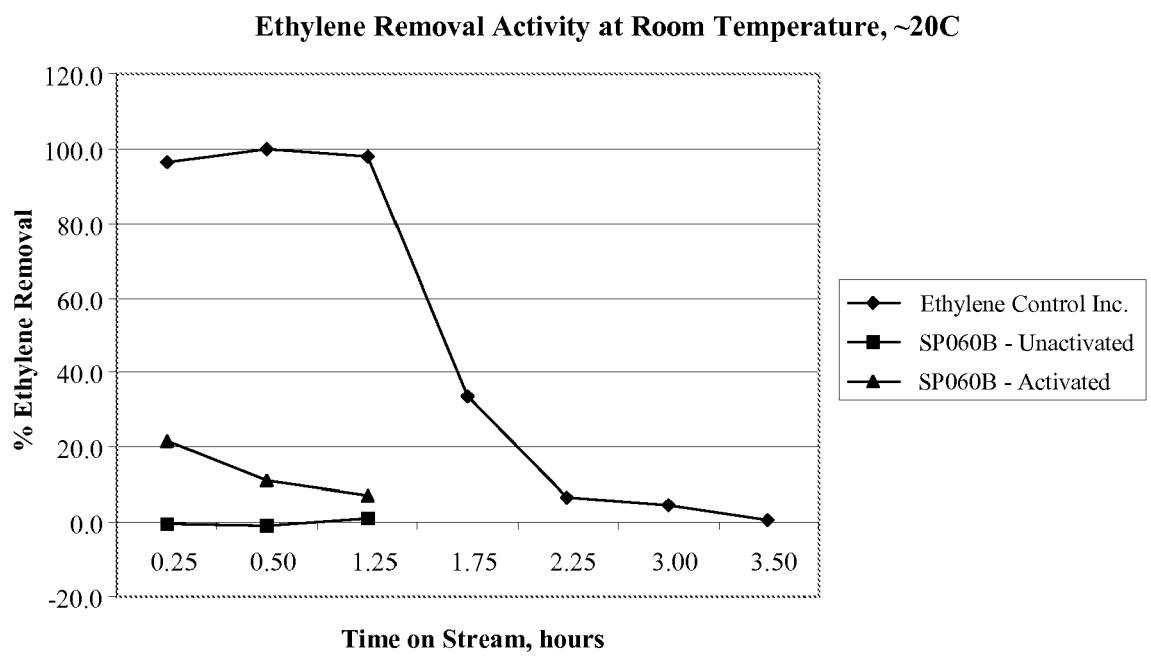
FIG. 1 Room temperature ethylene removal activity for SP060B and commercial material, 20 pmm ethylene in air, SV=18,000 $hr^{-1}$.

The materials disclosed herein are adsorbers and are capable of being employed in a process in which a phase, such as a stream of gas, vapor, liquid, solid, or mixtures thereof or of a plasma is contacted with the adsorber material selected from the general composition, causing constituents or components of the stream to be removed via adsorption onto the material. After adsorption, the material may be discarded, but optionally, it is regenerated by exposure to a regenerating parameter, such as an oxidizing environment at elevated temperature. As described herein, other means of regeneration may be employed including but not limited to one or more of a change in a physical parameter such as temperature and/or pressure, plasma bombardment, rinsing with a fresh purge gas or liquid, exposure to reducing or oxidizing gas and/or irradiation with ultrasonic waves of electromagnetic radiation.

Applications include, but are not limited to: 1) Removal of nitrogen-containing species from liquids, gases, vapors, or matter in other physical states. The nitrogen-containing species include amines, amides, aromatic nitrogen compounds, other ring containing nitrogen compounds, azides, nitrites, nitrates, nitrites, and others. 2) Removal of sulfur-containing species from gases, vapors, liquids, or matter in other physical states. In this case, regeneration can be obtained by hydrodesulfurization of adsorbed species. However, air oxidation and other methods may also be employed. 3) Removal of acid gases from gas or vapor streams. These acid gas species include nitrogen oxides, sulfur oxides, hydrogen halides, hydrogen cyanide, carbon dioxide, and others. 4) Removal of small molecules containing multiple bonds, such as CO, formaldehyde, ketones, olefins, etc., from gases, vapors, liquids, or matter in other physical states. 5) Removal of ammonia or water from gases, vapors, liquids, or matter in other physical states. 6) Removal of chemical warfare agents and toxic industrial chemicals containing sulfur, nitrogen, chlorine, fluorine, phosphonate, arsenic, and other species from gas, vapor, liquid, gel, biological surfaces, or other phases. 7) Removal of nonpolar or weakly polar molecules including aliphatic, olefinic, alkyne, and aromatic species from gases, liquids, vapors, or matter in other physical states. 8) Removal of metals and main group elements including mercury, arsenic, bismuth, cadmium, antimony, zinc, and others from gas, vapor, liquid, or other streams. 9) Removal of a multiplicity of species, including any of the above species in any combination. 10) Selective removal of species produced in plasmas or other media for the purpose of their isolation. This would be performed in the case of a search for randomly formed molecular or radical species. 11) Removal of ions from solutions (ion exchange media). 12) Deodorization of gases and vapors. 13) Cold-start adsorption of species in engine exhaust. 14) Other separation processes. This includes selective removal or separation of alkanes from olefins, alkynes, and aromatics; separation of monoolefins from diolefins; and separation of oxygenates from olefins.

The adsorbent may be employed in various forms depending on the application or as desired, including but not limited to the form of microporous, mesoporous, or macroporous materials; nanoparticles; fine powders; grains; pellets; extruded ceramic shapes; or wash-coated pellets or it may be supported on mineral materials (including volcanic ash), ash from combustion or gasification processes, ceramic or metal monoliths, filter (paper, textile, carbon, metals) fibers, ceramic or metal foams, or other structured supports. Adsorption processes utilizing the material and process of the present invention are optionally implemented using temperature swing, pressure swing, and combined temperature-pressure swing as well as other approaches. Reactors that can be employed with the invention include fixed bed systems operating under a plug flow regime or with axial and/or radial dispersion, a monolithic bed, fluidized bed, moving bed, slurry bed, or powder spray system. The material can be either discarded or regenerated: Regeneration can be effected by increasing temperature or decreasing pressure under a fresh purge gas, rinsing with a fresh purge gas or liquid, exposure to a reducing gas, exposure to an oxidizing gas, irradiation with ultrasonic waves, or by plasma bombardment.

The materials disclosed herein may be prepared by coprecipitation of constituent metal ions using base solutions (including ammonia, ammonium hydroxide, ammonium carbonate, ammonium oxalate, sodium or potassium carbonate, and sodium or potassium hydroxide), homogeneous precipitation with urea, sol gel methods, gel precipitation from non-aqueous solvents, impregnation of supports with precursors, spray pyrolysis of metal oxide precursors, spray drying, ceramic metal oxide method (physical admixing of constituent metal oxides), plasma processes, physical and chemical vapor deposition, and others. The above lists do not exhaust the possible embodiments of the present invention. Specific examples of preferred embodiments are presented below. It is to be understood by one of ordinary skill in the art, that the invention as claimed excludes compositions of matter and applications noted in any of the references disclosed herein. Those references are specifically incorporated by reference for materials disclosed therein and may be used to specifically exclude compounds known in the art from a genus, a Markush group or other class of compounds disclosed herein.

In specific embodiments, the adsorbents of this invention include those having the formula: $Ce_aLa_bMn_cCu_dO_w$, where a is 0.4 to 0.6; b is 0.01 to 0.06; c is 0.20 to 0.40 and d is 0.05 to 0.30 and w is a number which results in charge balance. All subranges and individual values of a, b, c and d within the listed ranges are included.

In specific embodiments, the adsorbents of this invention include those of the above formula which have the formula: $Ce_aMn_cCo_dO_w$, where a is 0.10 to 0.20; c is 0.30 to 0.80 and d is 0.10-0.60 and w is as defined above. All subranges and individual values of a, c and d within the listed ranges are included.

In specific embodiments, the adsorbents of this invention include those having the formula: Mn-Tetraphenylporphine-MCM, which is understood to refer to a material prepared by pyrolyzing a Mn tetraphenylporphyrin complex in the pores of MCM-48 or MCM-41.

In specific embodiments, the adsorbents of this invention include those having the formula: Tetraphenylporphine-MCM, which is understood to refer to a material prepared by pyrolyzing tetraphenylporphyrin molecules in the pores of MCM-48 or MCM-41.

When a group of substituents is disclosed herein, it is understood that all individual members of those groups and all subgroups, including any isomers and enantiomers of the group members, and classes of compounds that can be formed using the substituents are disclosed separately. When a compound is claimed, it should be understood that compounds known in the art including the compounds disclosed in the references disclosed herein are not intended to be included. When a Markush group or other grouping is used herein, all individual members of the group and all combinations and subcombinations possible of the group are intended to be individually included in the disclosure. Every formulation or combination of components described or exemplified can be used to practice the invention, unless otherwise stated. Specific names of compounds are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination. One of ordinary skill in the art will appreciate that methods, device elements, starting materials, synthetic methods, other than those specifically exemplified can be employed in the practice of the invention without resort to undue experimentation. All art-known functional equivalents, of any such methods and materials are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In this application certain composition of matter are described as "comprising" species of given chemical formula. In all cases in which a composition of matter is said to comprise a species of a given formula, the description will be understood to also include a composition of matter which consists essentially of the species of given formula as well as the composition of matter that consists of the species of given formula.

Although the description herein contains many specificities, these should not be construed as limiting the scope of the invention, but as merely providing illustrations of some of the embodiments of the invention. All references cited herein are hereby incorporated by reference to the extent that there is no inconsistency with the disclosure of this specification. Some references provided herein are incorporated by reference herein to provide details concerning additional starting materials, additional methods of synthesis, additional methods of analysis and additional uses of the invention. All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

The following examples are provided for illustration and are not intended to limit the invention.

Example 1

Adsorbent Materials for Reduction of Nitrogen in Naphtha Stream

Materials possessing the compositions shown in Table 1 are prepared by coprecipitation from aqueous solution. This Table includes both nominal compositions and those determined using energy dispersive x-ray (EDX).

Example 2

Adsorption of Hydrogen Cyanide in Air

A number of metal oxide, nanostructured metallocarbon, and metal exchanged zeolite materials are prepared. Materials are synthesized either by ion exchange, coprecipitation, or incipient wetness impregnation of alumina supports. 10% $Ce_{0.45}La_{0.05}Mn_{0.25}Cu_{0.25}O_{1.6}$ supported on alumina is prepared by incipient wetness impregnation of alumina as follows. A solution of the constituent metal nitrates is prepared by dissolving 0.85 g of $Ce(NO_3)_3 \cdot 6H_2O$, 0.095 g of $La(NO_3)_3 \cdot 6H_2O$, 0.313 g $Mn(NO_3)_3 \cdot 5.8H_2O$, and 0.25 g $Cu(NO_3)_2 \cdot 6H_2O$ are dissolved in a minimal amount of deionized water. This solution is added dropwise, with stirring to 5 g of Puralox alumina. The slurry is then air dried, followed by oven drying for ~16 hours. The dry powder is then calcined in air at 450° C. for 8 hours. Templated pyrolyzed metallomacrocycles are prepared by first impregnating a mesoporous silica material (MCM-48) with a metallomacrocycle (Mn-phthalocycanine. A macrocyclic ligand, tetraphenylporphine is also pyrolzyed in the pores of MCM-48). Synthesis of zeolite-based materials is described in the following paragraphs.

Three zeolite types are employed: Y, A, and ZSM-5. The zeolite A employed is obtained as 8-12 mesh spheres of molecular sieve 4A (Na form). The material is ground into a fine powder prior to ion exchange of the material in the manner which is described below. Zeolite Y (CBV100) powder is obtained in the sodium form. The sodium cation is subsequently exchanged out of the zeolite framework in each case using the constituent metal ions of the metal oxide sorbents of interest. The materials prepared as such are activated in situ by heating under air.

Sequential ion exchange from dilute aqueous solutions of the appropriate metal ions is performed. The procedure is exemplified by preparation of Cu—Y: To a 250 ml Erlenmeyer flask is added 13.11 g (56.36 mmol) of copper nitrate hexahydrate. 120 ml of deionized water is added and the solution heated to 65° C. to dissolve the metal nitrate. After allowing the copper nitrate to dissolve, 5.00 g (11.59 mmol) of CBV100 NaY (Si/Al=5.1) is added to the flask. The suspension is stirred for 2 hours at 65° C. After cooling to ambient temperature this heterogeneous medium is suction filtered through filter paper on a buchner funnel while washing with deionized water. The ion exchanged zeolite is air dried for 1-2 hours. The zeolite is collected, transferred to a 250 ml beaker and placed in a vacuum oven and dried in vacuo for 16 hrs at 135° C. The second exchange is performed in the same manner as the first, except that a fresh solution of copper nitrate is prepared, this time using 10.78 g (46.36 mmol) of the metal nitrate. Once the second exchange, filtration, and vacuum drying is performed, the dried zeolite is ground into a coarse powder with mortar and pestle and stored in a vial.

Recovery is 3.82 g of the Cu—Y. Preparation of Ag—Y is very similar, except that the synthesis is scaled down by a factor of two. Preparation of other materials are similar to that for Cu—Y. In the case of bimetallic materials (i.e., M/K (or Li) exchanged zeolites), the method is essentially the same as for the above example, except that the alkali metal is incorporated in the second ion exchange.

Zeolite Y pellets are obtained in the Na+ form. Their exchange (to give Co/K—Y and Mn/K—Y pellets) is performed in essentially the same manner as for the corresponding powder, with the alkali metal cation always being incorporated on the second exchange. Preparation method and conditions are summarized in Table 2.

In all cases, the experimental procedure involves packing the material as a powder or as fine granules into 4 mm inside diameter quartz tubing. A small piece of quartz wool is placed at one end of the plug for constraint and a smaller diameter quartz tube is used as a pedestal support for the sorbent plug. The test mixture employed is 900 ppm HCN in air. HCN concentrations are measured up- and down-stream of the sorbent plug using a gas chromatograph equipped with FID and Hayesep D column (nickel).

Experiments are performed using HCN in dry air. The second type is essentially the same, with the exception that the air diluted HCN is sparged through water at a fixed temperature (4 or 18-23° C.). In either case, the reactor containing the sorbent is mounted vertically in the test stand. In the third type of experiment, the sorbent is cooled to 0° C. by incorporating the reactor into a small refrigerator. Zeolite sample are generally initially preheated under flowing air to 600° C. to remove volatile species. After the reactor cools to room temperature (~21° C.), HCN (in air) is introduced. Samples are taken after 3-5 minutes and subsequently, every 10-20 minutes.

Results of the above measurements are summarized in Table 3. This data is all obtained under dry conditions. This data summary presents breakthrough time, capacity, and C*t.

Example 3

Adsorption of Ethylene from Air

The compositions below (in Table 4), prepared by coprecipitation, are tested for ethylene removal.

Ethylene Removal Activity. Experiments are conducted in a tubular packed bed reactor. Approximately 1.5 cm bed height of catalytic adsorbent material is loaded into the reactor, 20 ppm ethylene in air is allowed to flow through the system at a space velocity of 18,000 $hr^{-1}$. Gas samples are obtained of the feed and exit and analyzed using a Shimadzu GC-14A, flame ionization detector (FID), equipped with an Alltech 0.19% picric acid on Graphpac 80/100 column. Both the $Ce_{1-x-y-z}La_xMn_yCu_zO_{2-\delta}$ and a commercial supported $KMnO_4$ material are evaluated at various temperatures. Room temperature, ~20° C., data for both materials is shown in FIG. 1. The data shows for the metal oxide of the present invention no removal activity at room temperature. The same load is pretreated with flowing air at 200° C. overnight and re-evaluated for ethylene removal.

Figure 2:
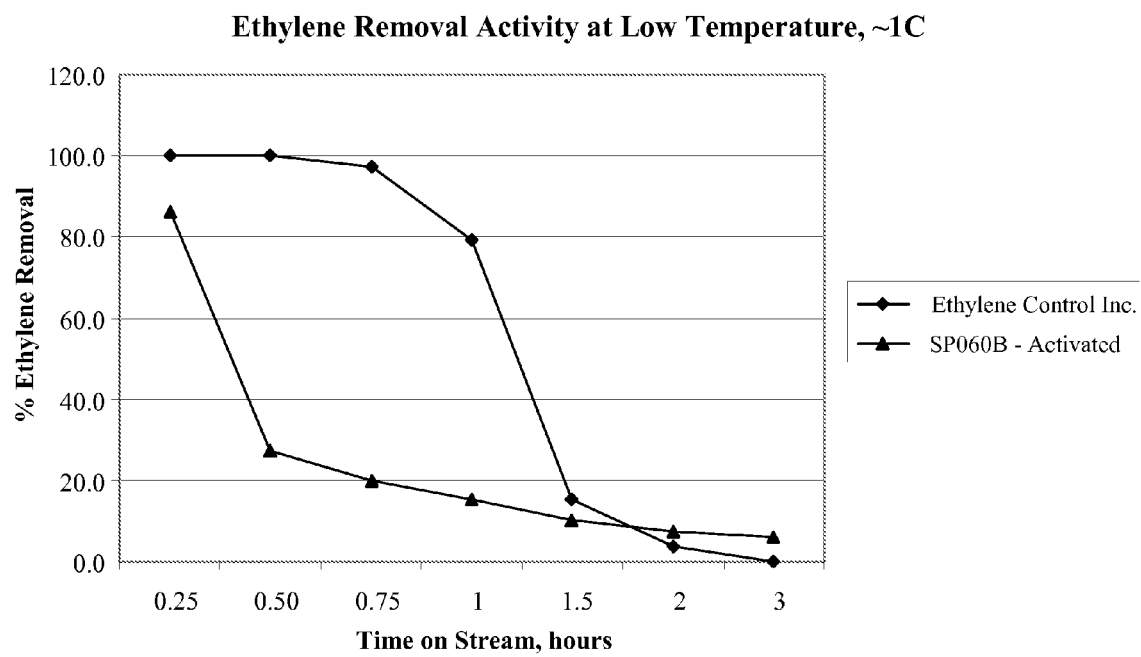
FIG. 2 Low temperature, ~1° C., ethylene removal activity for SP060B and $KMnO_4$, 20 pmm ethylene in air, SV=18,000 $hr^{-1}$.

FIG. 2 shows data for the removal of 20 ppm ethylene in air at a space velocity of 18,000 $hr^{-1}$ at low temperature, ~1° C. Here again the commercial material performed very well, and although SP060B did not have comparable activity, it does show some ethylene removal activity. This is a good indication that with some optimization a catalytic adsorbent can be identified with high ethylene removal activity and the ability to be regenerated.

Example 4

Removal of Mercury from Gas

The materials in Table 5 are prepared by calcining mixtures of metal oxides. All of the resulting metal oxide powders give x-ray diffraction patterns with a fluorite fingerprint. Sulfidation led to the powder product possessing an x-ray diffraction pattern with a fluorite fingerprint.

Sulfided catalysts prepared as above show essentially no differences in XRD patterns from the parent metal oxide materials. However, FT-IR spectra show some small, but significant changes in the form of small and fine oscillations, particularly in the region of 900-1100 cm$^{-1}$.

Experiments with sulfided cerium oxide materials are conducted. The experimental procedure generally consisted of preheating 1.0 g of the sulfided cerium oxide materials at 300° C. for 2 hours to drive off excess sulfur and water, followed by continued heating at 300° C. or 350° C. under mercury vapor carried in dry nitrogen gas. The weight of the U-tube reactor is determined before initiation of mercury sorption but after the thermal pretreatment step as well as after mercury adsorption for a fixed period of time. The Hg flask temperature is maintained at between 40-150° C. in subsequent experiments. Mercury sorption is performed for 2 hours in each case: the reactor temperature is ramped to its operating value (300 or 350° C.) over 1 hour under dry nitrogen and then held at the sorption temperature (300 or 350° C.) for 2 hours under 25 or 50 ml/min dry nitrogen. At the end of this period, the U-tube reactor is valved off and the mercury vapor diverted through a bypass. The detachable U-tube is then weighed. A baseline experiment using crushed quartz is also performed. Results are presented in Table 6.

REFERENCES

1. M. Flytzani-Stephanopoulos and Z. Hu, U.S. Pat. No. 5,242,673, Sep. 7, 1993.
2. T. Maunula, U.S. Pat. No. 6,818,582, Nov. 16, 2004.
3. N. Noda, F. Abe, and J. Suzuki, U.S. Pat. No. 6,667,018, Dec. 23, 2003.
4. O. Koper, K. J. Klabunde, L. S. Martin, K. B. Knappenberger, L. L. Hladky, and S. P. Decker, U.S. Pat. No. 6,653,519, Nov. 25, 2003.
5. F. S. Modica, M. K. Barr, G. A. Huff, R. H. Cayton, B. D. Alexander, and R. A.
Kretchmer, U.S. Pat. No. 5,916,129, Jun. 29, 1999.
6. N. Noda. Y. Shibagaki, H. Mizuno, and A. Takahashi, U.S. Pat. No. 5,884,473, Mar. 23, 1999.
7. A. Bhattacharyya, M. J. Foral, and W. J. Reagan, U.S. Pat. No. 5,750,020, May 12, 1998.
8. F. S. Modica, M. K. Barr, G. A. Huff, R. H. Cayton, B. D. Alexander, and R. A.
Kretchmer, U.S. Pat. No. 5,687,565, Nov. 18, 1997.
9. A. Bhattacharyya, M. J. Foral, and W. J. Reagan, U.S. Pat. No. 5,591,418, Jan. 7, 1997.
10. J. S. Buchanan, M. F. Mathias, J. F. Sodomin III, and G. J. Teitman, U.S. Pat. No. 5,591,417, Jan. 7, 1997.
11. J. S. Buchanan, D. L. Johnson, J. F. Sodomin III, and G. J. Teitman, U.S. Pat. No. 5,458,861, Oct. 17, 1995.
12. S. Onitsuka, M. Ichiki, C. Inazumi, T. Watanabe, A. Fukuju, M. Akiyama, Y.
Sairyo, and H. Kobayashi, U.S. Pat. No. 5,439,868, Aug. 8, 1995.
13. A. S. Moore, D. B. Bartholic, D. F. Barger, and W. J. Reagan, U.S. Pat. No. 4,917,875, Apr. 17, 1990.
14. M. Miyazawa, N. Kobayashi, H. Takatsuka, A. Morii, T. Koyanagi, T. Seto, K.
Iida, S. Mitsuoka, H. Rikimaru, M. Imanari, T. Koshikawa, A. Yamauchi, M.
Hanada, M. Fukuda, and K. Nagano, U.S. Pat. No. 4,869,735, Sep. 26, 1989.
15. S. E. Roark and J. H. White, U.S. Pat. No. 6,787,118, Sep. 7, 2004.
16. S. E. Roark and J. H. White, U.S. Pat. No. 6,458,741, Oct. 1, 2002.
17. S. E. Roark, U.S. Patent Application No. 20030166987.

Example 5

Adsorbent Material for Removal of CO from Air

Figure 3:
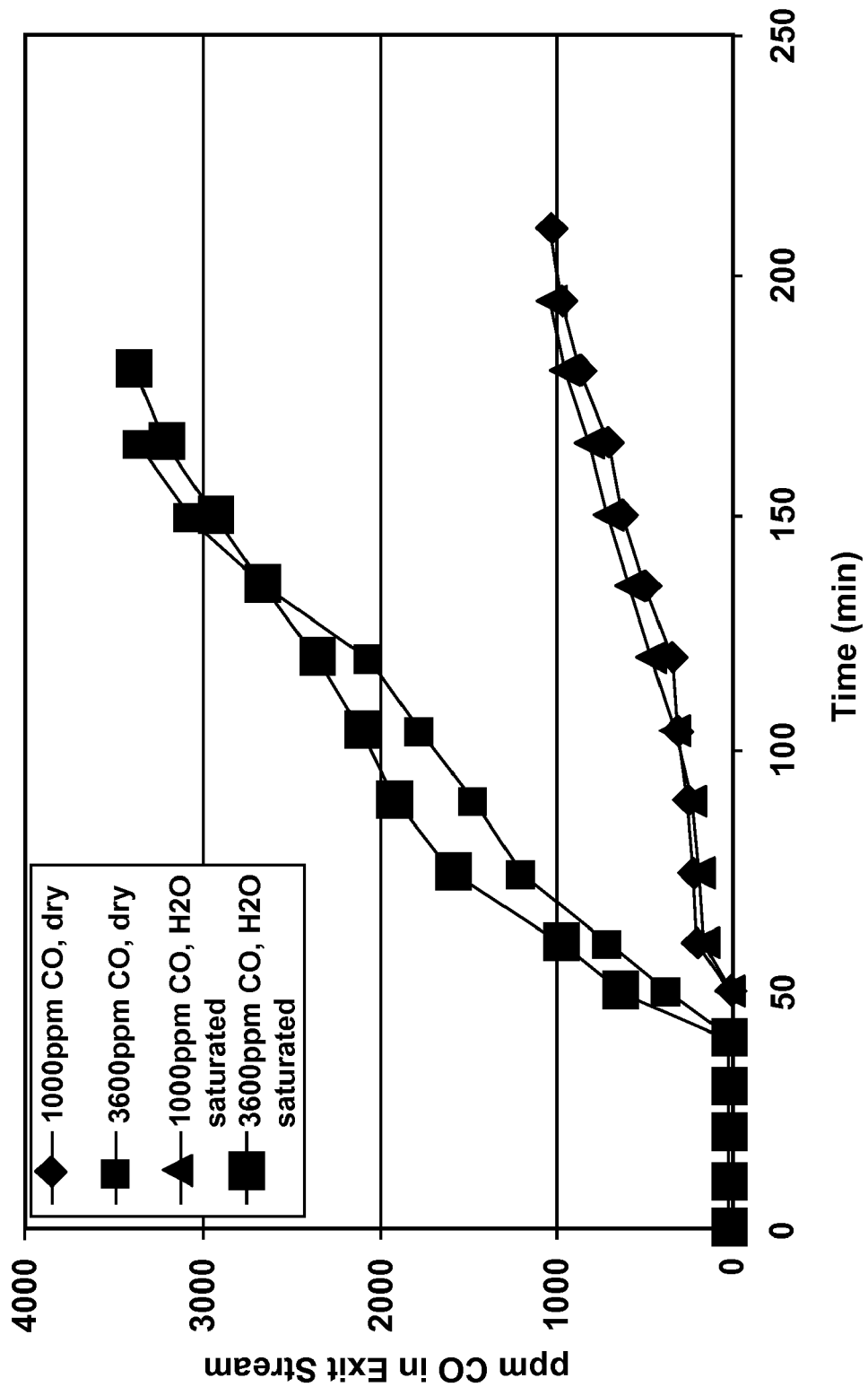
FIG. 3 Plots of CO in exit stream of CO/air mixture. GHSV=10,000 $h^{-1}$. T=23° C.

The material $Ce_{0.55}La_{0.03}Mn_{0.33}Cu_{0.09}O_{2-\alpha}$ is prepared as above by coprecipitation. A sample of the adsorbent material of size 0.12 g is exposed to 1000 to 3600 ppm CO in air with a gas hourly space velocity of 10,000 h$^{-1}$. CO concentration is monitored at both the entrance and exit of the reactor. FIG. 3 shows plots of the exit CO concentration for four cases: 1000 ppm CO, dry and water saturated and 3600 ppm CO, dry and water saturated. The data shows that CO appeared in the reactor exhaust (i.e., breakthrough) between 40 and 50 minutes, corresponding to a weight capacity between 0.9 to 2.4 wt %. It is also evident that both the presence of water vapor at 100% relative humidity and a higher concentration of CO led to a slight reduction in breakthrough time.

Factors contributing to the performance (i.e., capacity) of adsorbents may be summarized as follows:

1) Composition. There are a limited number of adsorbent compositions which have been shown to be effective in any particular application. Adsorbents in industrial use are generally comprised of carbon, alumina, or silica, largely because of the ease with which these materials can be produced with high surface area. Composition can be determined, as it has for a number of materials of the present invention, using any of several elementally sensitive techniques, including energy dispersive x-ray spectroscopy (EDX or EDX), x-ray fluorescence, and atomic absorption spectrometry (AAS). The first technique has been employed in determining compositions of various materials of the present invention.

2) Preparation. Particular methods of preparation give rise to materials possessing preferred properties such as high surface area, high surface defect population, and higher acidity or basicity. Among the methods that can be cost-effectively applied to preparing adsorbents include coprecipitation, wetness impregnation of supports, ion exchange of molecular sieves, spray drying, and sol gel methods. The first three methods have, in particular, been employed to prepare inorganic materials of the present invention. Pyrolysis of metal complexes or of their ligands in an inorganic template or mold is used to prepare specific materials of the present invention.

3) Surface area. Higher areas provide a greater number of adsorption sites than materials with lower surface areas. This can be achieved by coprecipitation and, in particular, coprecipitation of certain compositions. For example, it is found that while ceria (CeO$_2$) can be prepared with surface area ≦65 m$^2$/g, the addition of other species (e.g., copper oxide precursor) can greatly enhance surface area: values as high as 230 m$^2$/g have been obtained. Surface area is readily measured using the well known nitrogen physisorption technique along with a model of nitrogen adsorption which allows surface area to be extracted from the resultant nitrogen adsorption/desorption isotherms. Surface areas of a several specific materials of the present invention have been obtained and are presented. Accordingly, in any of the applications described herein, the adsorbent may be presented in a manner to provide a high surface area to the adsorbate, such as adsorbent surface areas that are greater than 100 m$^2$/g, greater than 200 m$^2$/g or a surface area selected from a range that is between about 100 m$^2$/g and about 250 m$^2$/g.

4) Pore volume. This is generally proportional to surface area but also influences the size of molecules that can be admitted and the strength of the interactions between adsorbates and adsorbents. Zeolites, for example, exert very powerful electric field gradients on molecules which can influence extent of adsorption and capacity.

5) Surface acid/base properties (in both Lewis and Bronsted pictures) of the material. Acidic or basic molecules are adsorbed onto the conjugate surface (i.e., basic or acidic, respectively) sites, with a preponderance of one or the other type of site and greater acid or base strength favoring coverage of the conjugate. These properties can be measured by titration with an organic indicator, measurement of the amount of a gas phase acid or base taken up by the adsorbent, or by the extent of reaction of a molecule in and acid (or base) dependent reaction(s) such as cracking or isomerization.

6) Strong chemical interactions or reactions between adsorbate and adsorbent. This would include the formation of surface compounds with adsorbates, e.g., between a number of metal oxide systems and hydrogen sulfide in which surface metal sulfide compounds may be formed. The presence of sulfur on metal oxide adsorbents appears to be important for their use in the removal of mercury (and other metals) from gas streams. Elemental analysis of adsorbents as well as temperature programmed desorption can detect such species on the adsorbent surface.

7) High surface defect population. This feature leads to an increased population of surface sites with more "dangling bonds" and, hence, to stronger interaction with adsorbates. Temperature programmed desorption is again useful in identifying the presence of such features.

8) Transition metal sites. These sites, especially those in later groups, provide variable redox states and vacant d—orbital density, which interacts with adsorbates (i.e., ligands) with unshared electron pairs or electron density available in other readily available forms.

9) Dielectric properties of adsorbents. It is clear that polar molecules preferentially interact with polar surfaces and nonpolar adsorbates with nonpolar surfaces.

Other properties that can distinguish the adsorbent materials of the present invention from the art include: 10) the crystal structure or crystal system, which would be determined using x-ray or neutron diffraction or electron diffraction as is obtained in transmission electron microscopy. The ability to identify crystallographic phases can be employed to distinguish the materials of the present invention from the art.

Interactions between molecules and adsorbents must be sufficiently strong that capacity of the material can be attained. Nevertheless, removal of adsorbed molecules is desirable to allow adsorbent regeneration to occur. As disclosed herein, a number of mechanisms (oxidative, reductive, thermal desorption) for regeneration are permissible, but it has been found that the oxidative pathway is preferable for metal oxide materials containing transition metal oxide and oxygen transfer promoting metal oxide components. In this case, the saturated adsorbent is heated gently in air, causing the adsorbed molecules to be oxidized and desorbed. Certain multivalent metal cations (e.g., cerium, praseodymium, manganese, or cobalt) are particularly effective in promoting regeneration as is evident by compositions of specific embodiments of the present invention.

Three embodiments of the materials of this aspect of the invention are: 1) The metal oxide system $RE_{1-x-y-z}B_xB'_yB''_zO_w$, 2) the transition metal cation and alkali metal cation exchanged zeolite material, and 3) the "nanocast" material prepared by pyrolysis of metal complexes in porous inorganic material. In another embodiment, any of the materials disclosed herein (e.g., an "adsorbent" or an "adsorber") are employed in methods for removing chemical species (e.g., an "adsorbate") from one phase (e.g., the phase in which the adsorbate is suspended and introduced to the adsorbent) and onto the surface, into pores or into the bulk of the adsorbent material. The metal oxide embodiment $RE_{1-x-y-z}B_xB'_yB''_zO_w$ is most appropriate for adsorption of CO, HCN, nitrogen containing compounds (e.g., amines), $H_2S$, organosulfides, and metals (e.g., Hg).

In specific embodiments, the adsorbents of this invention include those having the formula: $Ce_aLa_bMn_cCu_dO_w$, where a is 0.4 to 0.6; b is 0.01 to 0.06; c is 0.20 to 0.40 and d is 0.05 to 0.30 and a is as defined above. All subranges and individual values of a, b, c and d within the listed ranges are included. Even more preferred ranges are: $0.45 \leq a \leq 0.6$, $0.02 \leq b \leq 0.05$, $0.25 \leq c \leq 0.4$, and $0.05 \leq d \leq 0.25$, as shown in Table 7 (compositions are determined by EDX).

This material is prepared by: 1) coprecipitation (CLMC-001) or by 2) coprecipitation/impregnation (CLMC-002 through 005) as follows. In the first case, an aqueous solution of the component metal nitrates is prepared by dissolving 74.23 g $Ce(NO_3)_3.6H_2O$, 33.71 g of a 50.4 wt % $Mn(NO_3)_2$ solution, 8.24 g $La(NO_3)_3.6H_2O$, and 22.10 g of $Cu(NO_3)_2.2.5H_2O$ in 400 ml of deionized water and adding (with stirring) 2 liters of 2% $NH_4OH$ in water over 30 minutes. Stirring is continued for 30 minutes after completing the addition, the resulting precipitate filtered and washed 3 times with 1500 ml of deionized water, and the precipitate dried in air overnight (16 hours) prior to calcining in air at 450° C. for 8 hours. The second procedure involves first preparing a solution of the first three metal components in the amounts above in 300 ml of deionized water, adding 2 liters of 2% $NH_4OH$ in water over 30 minutes with stirring, followed by collection of the precipitate by filtration, washing with water, and drying the precipitate. 0.884 g of $Cu(NO_3)_2.2.5H_2O$ in 15 ml of deionized water is then added to the precipitate and the mixture stirred and allowed to dry in air. Calcination in air is again performed at 450° C. for 8 hours.

One way of improving performance (per unit weight) of the adsorbent CLMC is to support it on alumina as is illustrated by the data of Example 3. This enabled the uptake of HCN per unit weight of CLMC to be increased almost six-fold. The surface areas of materials are given in Table 8.

Thus, surface area for the $Ce_aLa_bMn_cCu_dO_w$, in an embodiment, may range from 10-500 $m^2/g$, but more preferably ranges from 50 $m^2/g$ to 250 $m^2/g$.

In specific embodiments, the adsorbents of this invention include those of the above formula which have the formula $Ce_aMn_cCo_dO_w$, where a is 0.10 to 0.20; c is 0.30 to 0.80 and d is 0.10-0.60 and w is as defined above. All subranges and individual values of a, c and d within the listed ranges are included. For the $Ce_aMn_cCo_dO_{2-\alpha}$ embodiment, the preferred surface area is between 10-500 $m^2/g$ and more preferably, between 50 and 200 $m^2/g$.

The embodiment represented by the "nanocast" materials are most appropriate for adsorbing HCN, $CO_2$, $H_2S$, and CO. These materials present high surface areas and high pore volume in addition to transition metal cation, nitrogenous base sites, and both polar and nonpolar features. Table 9 provides various materials to illustrate the breadth of these materials.

In specific embodiments, the adsorbents of this invention include those having the formula: Mn-Tetraphenylporphine-MCM, which is understood to refer to a material prepared by pyrolyzing a Mn tetraphenylporphyrin complex in the pores of MCM-48 or MCM-41. Preferred surface areas are between 200 and 2000 $m^2/g$ and, more preferably, between 600 and 1200 $m^2/g$ and even more preferably, between 900 and 1100 $m^2/g$.

In specific embodiments, the adsorbents of this invention include those having the formula: Tetraphenylporphine- MCM, which is understood to refer to a material prepared by pyrolyzing tetraphenylporphyrin molecules in the pores of MCM-48 or MCM-41. Preferred surface areas are between 200 and 2000 m$^2$/g and, more preferably, between 600 and 1200 m$^2$/g and even more preferably, between 900 and 1100 m$^2$/g.

TABLE 1

Adsorbents for Removing Nitrogen Compounds from Naphtha Composition $Ce_{0.45}La_{0.05}Mn_{0.25}Cu_{0.25}O_{2-\alpha}$
$Ce_{0.56}La_{0.02}Mn_{0.34}Cu_{0.08}O_{2-\alpha}$
$Ce_{0.58}La_{0.03}Mn_{0.30}Cu_{0.09}O_{2-\alpha}$
$Ce_{0.54}La_{0.03}Mn_{0.36}Cu_{0.07}O_{2-\alpha}$
$Ce_{0.55}La_{0.03}Mn_{0.28}Cu_{0.14}O_{2-\alpha}$
$Ce_{0.55}La_{0.03}Mn_{0.35}Cu_{0.07}O_{2-\alpha}$
$Ce_{0.55}La_{0.03}Mn_{0.33}Cu_{0.09}O_{2-\alpha}$
$Ce_{0.12}Mn_{0.34}Co_{0.54}O_{1.64}$
$Ce_{0.16}Mn_{0.71}Co_{0.13}O_{1.64}$
$Ce_{0.15}Mn_{0.75}Co_{0.10}O_{1.64}$

TABLE 2

Summary of Materials Investigated for HCN Adsorption

| Material | Preparation Method | Pretreatment |
|---|---|---|
| Ag—Y | Double ion exchange | 600 (in situ) |
| Co—Y | Double ion exchange | 600 (in situ) |
| Cu—Y | Double ion exchange | 600 (in situ) |
| Fe—Y | Double ion exchange | 600 (in situ) |
| Mn—Y | Double ion exchange | 600 (in situ) |
| Zn—Y | Double ion exchange | 600 (in situ) |
| Tetraphenylporphine pyrolyzed in MCM-48 (TPP-MCM-1) | Pyrolysis of precursor | None |
| Mn phthalocyanine pyrolyzed in MCM-48 (Mn-Pc-MCM-2a) | Pyrolysis of precursors | None |
| $Ce_{0.48}Zr_{0.05}Mn_{0.48}O_{2-\delta}$ | MeOH co-precipitation | 500 |
| Co-ZSM-5 | Double Ion exchange | 600 |
| Zn-ZSM-5 | Ion exchange | 600 |
| Co,K—Y | Ion exchange | 600 |
| Zn,K—Y | Ion exchange | 600 |
| Mn,K—Y | Ion exchange | 600 |
| Co-A | Ion exchange | 600 |
| Zn-A | Ion exchange | 600 |
| $Ce_{0.3}Cu_{0.7}O_{2-\delta}$ | MeOH co-precipitation | None |
| $Ce_{0.45}La_{0.05}Mn_{0.25}Cu_{0.25}O_{2-\delta}$ | MeOH co-precipitation | None |
| 10% $Ce_{0.12}Co_{0.54}Mn_{0.34}O_{2-\delta}$ supported on Puralox $Al_2O_3$ | MeOH co-precipitation | None |
| 10% $Ce_{0.45}La_{0.05}Mn_{0.25}Cu_{0.25}O_{2-\delta}$ supported on Puralox $Al_2O_3$ | MeOH co-precipitation | None |
| C2A1 cannister carbon | As received (removed from cannister) | As received |
| Co/Li—Y | Ion exchange | 600 |
| Mn/Li—Y | Ion exchange | 600 |
| $Ce_{0.45}La_{0.05}Mn_{0.25}Cu_{0.25}O_{2-\delta}$ + teflon powder | MeOH co-precipitation, mixing and grinding | 600 (before mixing with teflon) |
| Co,K—Y Pellets | Ion exchange | 600 |
| Mn,K—Y Pellets | Ion exchange | 600 |

TABLE 3

Summary of Data Obtained for Adsorption of 900 ppm HCN (in air) Under Dry Conditions Over Candidate Sorbents

| No. | Sorbent | Bed height (cm) | Sorbent Mass (g) | HCN Flow (ml/min) | GHSV (h$^{-1}$) | BT Time (min) | BT Conc. (ppm HCN) | Capacity at BT (wt %) | Regenerated BT Time (min) | Regenerated BT Conc. (ppm HCN) | C * t (mg · min/m$^3$) 1$^{st}$ Cycle | C * t (mg · min/m$^3$) 2$^{nd}$ Cycle |
|---|---|---|---|---|---|---|---|---|---|---|---|---|
| 1 | Fe—Y | 1.55 | 0.1 | 50 | 15402 | 31 | 11 | 1.5 | — | — | 25798 | — |
| 2 | Co—Y | 1.52 | 0.08 | 35 | 10994 | 60 | 24 | 2.6 | 78 | 124.61 | 49932 | 64912 |
| 3 | Zn—Y | 1.51 | 0.112 | 50 | 15810 | 90 | 20 | 4.0 | 26 | 155.7 | 74897 | 21637 |
| 4 | Cu—Y | 1.2 | 0.06 | 20 | 7958 | 82 | 8 | 2.7 | 37 | 9.36 | 68240 | 30791 |
| 5 | TPP-MCM-1 | 1.49 | 0.076 | 50 | 16022 | 33 | 578 | 2.2 | — | — | 27462 | — |
| 6 | MnPc-MCM-2a | 1.55 | 0.055 | 45 | 13862 | 3 | 762 | 0.2 | — | — | 2497 | — |
| 7 | Mn—Y | 1.49 | 0.099 | 45 | 14420 | 72 | 48 | 3.3 | 57 | 46 | 59918 | 47435 |
| 8 | Ag—Y | 1.04 | 0.074 | 50 | 22955 | 31 | 11 | 2.1 | 31 | 97 | 25798 | 25798 |
| 9 | Co-ZSM-5 | 1.6 | 0.116 | 50 | 14921 | 20 | 39 | 0.86 | — | — | 16644 | — |
| 10 | Zn-ZSM-5 | 1.49 | 0.101 | 50 | 16022 | 4 | 137 | 0.2 | — | — | 3329 | — |
| 11 | CoK—Y | 1.461 | 0.104 | 35 | 11438 | 388 | 240 | 13 | 264 | 14 | 322890 | 219701 |
| 12 | Co-A | 1.42 | 0.109 | 35 | 11768 | 201 | 4.1 | 6.4 | 100 | 18 | 167271 | 83220 |
| 13 | Zn-A | 1.55 | 0.103 | 35 | 10781 | 218 | 25 | 7.4 | 78 | 46 | 181418 | 64912 |
| 14 | $Ce_{0.48}Zr_{0.05}Mn_{0.48}O_{2-\delta}$ | 1.46 | 0.179 | 30 | 9811 | 129 | 238 | 2.1 | 230 | 108 | 107353 | 191406 |
| 15 | $Ce_{0.45}La_{0.05}Mn_{0.25}Cu_{0.25}O_{2-\delta}$ | 1.55 | 0.25 | 35 | 10781 | 462 | 153 | 6.5 | 447 | 7 | 384473 | 371993 |
| 16 | $Ce_{0.3}Cu_{0.7}O_{2-\delta}$ | 1.55 | 0.466 | 35 | 10781 | 6 | 327 | 0.045 | — | — | 4993 | — |
| 17 | 10% $Ce_{0.12}Co_{0.54}Mn_{0.34}O_{1.64}$/Puralox $Al_2O_3$ | 1.47 | 0.171 | 35 | 11337 | 244 | 31 | 5 | 235 | 13 | 203055 | 195567 |
| 18 | Gas mask canister | 1.7 | 0.13 | 50 | 14043 | 152 | 39.5 | 5.8 | — | — | 126493 | — |
| 19 | ZnK—Y | 1.45 | 0.0614 | 35 | 11525 | 117 | 6 | 6.6 | 35 | 9 | 97366 | 29127 |
| 20 | MnK—Y | 1.71 | 0.0822 | 35 | 9773 | 347 | 195 | 14.7 | 385 | 10 | 288771 | 320394 |
| 21 | 10% $Ce_{0.45}La_{0.05}Mn_{0.25}Cu_{0.25}O_{2-\delta}$/$Al_2O_3$ | 1.75 | 0.21 | 35 | 9549 | 214 | 106 | 3.6 | 92 | 274 | 178089 | 76562 |

TABLE 4

Elemental analysis of Catalytic Adsorbents Employed for Ethylene Removal.

| Ce At % | La At % | Mn At % | Cu At % | Composition |
|---|---|---|---|---|
| 52.903 | 2.975 | 42.741 | 1.381 | $Ce_{0.53}La_{0.03}Mn_{0.43}Cu_{0.01}O_{1.69}$ |
| 56.312 | 6.101 | 36.091 | 1.496 | $Ce_{0.56}La_{0.06}Mn_{0.36}Cu_{0.01}O_{1.70}$ |
| 52.916 | 3.561 | 38.844 | 4.679 | $Ce_{0.53}La_{0.04}Mn_{0.39}Cu_{0.05}O_{1.69}$ |

TABLE 5

Catalytic Sorbents for Mercury Vapor

| Material |
|---|
| $CeO_2$ |
| $Ce_{0.9}La_{0.1}O_{1.95}$ |
| $Ce_{0.9}Ni_{0.1}O_{1.9}$ |
| $Ce_{0.9}Zr_{0.1}O_2$ |
| $Ce_{0.9}Fe_{0.1}O_{1.9}$ |
| $Ce_{0.7}Fe_{0.3}O_{1.7}$ |
| $Ce_{0.5}Fe_{0.5}O_{1.5}$ |

TABLE 6

Summary of Data for Mercury Adsorption.

| Material | Temperature (°C.) | Hg Uptake Sorbent - Hg Uptake Quartz (mg) | Standard Deviation |
|---|---|---|---|
| $CeO_2$ | 300 | 2 | 1.5 |
|  | 350 | 0 | 3.2 |
| $Ce_{0.9}Fe_{0.1}O_{1.9}$ | 300 | 6 | 4.5 |
|  | 350 | 8 | 0.7 |
| $Ce_{0.3}Fe_{0.3}O_{1.7}$ | 300 | 6 | 9.9 |
|  | 350 | 7 | 0 |
| $Ce_{0.5}Fe_{0.5}O_{1.5}$ | 300 | 0 | 2.1 |
|  | 350 | 2.5 | 9.2 |
| $Ce_{0.9}Ni_{0.1}O_{1.9}$ | 300 | 6.5 | 9.3 |
|  | 350 | 0 | 0 |
| $Ce_{0.9}La_{0.1}O_{1.95}$ | 300 | 7 | 2.5 |
|  | 350 | 18 | 13 |
| $Ce_{0.9}Zr_{0.1}O_2$ | 300 | 0 | 4.2 |
|  | 350 | 4 | — |
| Quartz | 300 | 0 | 3.1 |
|  | 350 | 0.6 | 2.2 |

TABLE 7

Examples of Metal Oxide Adsorbent Species

| Material ID | Target: $Ce_{0.45}La_{0.05}Mn_{0.25}Cu_{0.25}O_{2-\alpha}$ |
|---|---|
| CLMC-001 | $Ce_{0.56}La_{0.02}Mn_{0.34}Cu_{0.08}O_{2-\alpha}$ |
| CLMC-002 | $Ce_{0.58}La_{0.03}Mn_{0.30}Cu_{0.09}O_{2-\alpha}$ |
| CLMC-003 | $Ce_{0.54}La_{0.03}Mn_{0.36}Cu_{0.07}O_{2-\alpha}$ |
| CLMC-004 | $Ce_{0.55}La_{0.03}Mn_{0.28}Cu_{0.14}O_{2-\alpha}$ |
| CLMC-005 | $Ce_{0.55}La_{0.03}Mn_{0.35}Cu_{0.07}O_{2-\alpha}$ |

TABLE 8

Examples of Surface Area of Adsorbent Materials

| Material | Surface Area (m²/g) |
|---|---|
| CLMC | 209 |
| 10% CLMC/$Al_2O_3$ | 205 |
| $Ce_{0.12}Mn_{0.34}Cu_{0.54}O_{2-\delta}$ | 79 |
| 10 wt % $Ce_{0.12}Mn_{0.34}Cu_{0.54}O_{2-\delta}$/$Al_2O_3$ | 157 |
| $CeO_2$ (precipitated) | 63 |
| $Al_2O_3$ | 376 |

TABLE 9

Examples of Nanocast Adsorbent Materials

| Material | BET (m²/g) | Pore size (Å) | Total Pore Volume (cm³/g) |
|---|---|---|---|
| CoPC-MCM-2 | 809.81[a] | — | — |
| CoPC-MCM-3 | 832.17[b] | — | — |
| CoPC-MCM-4 | 29.60 | — | — |
| CoPC-SBA-2 | 21.53[b] | — | — |
| CoPC-SBA-3 | 13.28 | — | — |
| CoTPP-MCM-1 | 906.0 | 31 | 0.55 |
| CoTPP-MCM-2 | — | 38 | 0.039 |
| CoTPP-SBA-1 | 726.9 | — | — |
| CoTPP-SBA-2 | 810.1 | 35 | 0.533 |
| CoTPP-SBA-3 | — | 19, 22, 34 | 0.0885 |
| CoTPP-SBA-4 | 92.18 | 35 | 0.0584 |
| CoTPP-60A-1 | 396.2 | 35 | 0.28 |
| 1:4CoTPP:TPP-MCM-1 | 701.7 | 34 | 0.48 |
| 1:7CoTPP:XC72R | 158.4 | — | 0.364 |
| 1:1:12 CoTPP:FeTPP:XC72R | 151.7 | — | 0.467 |
| 1:1CoTPP:FeTPP-MCM-600C | 22.06 | — | 0.19 |
| 1:1CoTPP:FeTPP-MCM-800C | 58.48 | 34 | 0.129 |
| CuPC-MCM-2 | 168.86 | — | — |
| CuPC-SBA-1 | 10.39 | — | — |
| CuTPP-MCM-1 | 1034 | 34 | 0.184 |
| FePC-MCM-1 | 3.59 | — | — |
| FePC-MCM-2b | 9.35 | — | — |
| FePC-MCM-2c1 | 479.19 | — | — |
| FeTPP-MCM-1 | 686.80 | — | — |
| MnTPP-MCM-1 | 399.40 | — | — |
| NiPC-MCM-1b | 200.44 | — | — |
| NiPC-MCM-1c1 | 240.60 | — | — |
| NiPC-MCM-1c2 | 125.79 | — | — |
| NiTPP-SBA-1 | 303.3 | — | — |
| 1:9NiTPP:Pt-SBA-1 | 176.9 | 34 | 0.12 |
| RuTPP-SBA-1 | 546.1 | — | — |
| PC-MCM-1 | 379.9 | 39 | 0.235 |
| TPP-MCM-1 | 491.5 | 34 | 0.36 |
| FA-1b | 40.45 | — | — |
| FA-1c | 472.10 | 33 | 0.322 |
| FA-2 | 190.9 | 30 | 0.14 |

We claim:

1. A method for at least partially removing an adsorbate from a phase, said method comprising:
   providing an adsorbent material;
   contacting said adsorbent material with said phase having an adsorbate, thereby at least partially removing said adsorbate;
   said adsorbent material having the chemical formula $RE_{1-x-y-z}B_xB'_yB''_zO_w$ wherein
   RE is a rare earth metal selected from the group consisting of Ce, Pr, Sm, Eu, Tb, Tm, and Yb;
   B is a trivalent metal ion selected from the group consisting of Gd, Nd, Dy, Ho, Er, Lu, Sc, Y, La, Bi, Sb, In, Sn, Ga, and Al;
   B' is a transition metal ion selected from the group consisting of Ti, Zr, V, Cr, Mn, Fe, Ru, Co, and Ni, or B' is an alkaline earth element selected from the group consisting of Mg, Ca, Sr, and Ba;

B" is a transition metal ion selected from the group consisting of Cu, Ag, and Zn;

$0 \leq x \leq 0.25$; $0 \leq y \leq 0.95$; $0 \leq z \leq 0.75$; w is a number which results in charge balance; and $x+y+z<1$;

wherein said phase is a gas and said adsorbate is selected from the group consisting of hydrogen cyanide, formaldehyde, carbon dioxide, ethylene, mercury, nitrogen containing compounds, amines, $H_2S$, organosulfides, and metals.

2. The method of claim 1, wherein said adsorbent has the chemical formula:

$$Ce_{1-x-y-z}B_xB'_yB''_zO_w$$

wherein B is a trivalent metal ion selected from the group consisting of Gd, La, Bi, and Sc; and B' is a transition metal ion selected from the group consisting of Ti, Zr, V, Cr, Mn, Fe, Ru, Co, and Ni.

3. The method of claim 1, wherein said adsorbent has the chemical formula:

$$Ce_aLa_bMn_cCu_dO_w,$$

wherein $0.4 \leq a \leq 0.6$; $0.01 \leq b \leq 0.06$; c is $0.20 \leq c \leq 0.40$; $0.05 \leq d \leq 0.30$.

4. The method of claim 1, wherein said adsorbent has the chemical formula:

$$Ce_aLa_bMn_cCu_dO_w,$$

wherein $0.45 \leq a \leq 0.6$, $0.02 \leq b \leq 0.05$, $0.25 \leq c \leq 0.4$, and $0.05 \leq d \leq 0.25$.

5. The method of claim 1, wherein adsorbate is selected from the group consisting of ethylene; ammonia; formaldehyde; and carbon dioxide.

6. The method of claim 1, further comprising regenerating said adsorbent material with a regeneration step, said regeneration step comprising exposing said adsorbent material that has adsorbed at least a portion of said adsorbate to a regenerating parameter, said regenerating parameter selected from the group consisting of:

an increase in temperature under a fresh purge gas;
a decrease in pressure under a fresh purge gas;
rinsing with a fresh purge gas;
rinsing with a fresh purge liquid;
exposure to a reducing gas;
exposure to an oxidizing gas;
irradiation with ultrasonic waves; and
plasma bombardment.

7. The method of claim 1, wherein said adsorbate comprises one or more of HCN, nitrogen containing compounds, amines, $H_2S$, organosulfides, Hg, and metals.

8. The method of claim 1, wherein said adsorbent has a surface area exposed to said phase, said surface area is selected from a range that is greater than or equal to 10 $m^2/g$ and less than or equal to 500 $m^2/g$.

9. The method of claim 8 wherein said adsorbent has the chemical formula $Ce_aLa_bMn_cCu_dO_w$, wherein $0.4 \leq a \leq 0.6$; $0.01 \leq b \leq 0.06$; c is $0.20 \leq c \leq 0.40$; $0.05 \leq d \leq 0.30$.

10. A method for at least partially removing an adsorbate from a phase, said method comprising:
providing an adsorbent material;
contacting said adsorbent material with said phase having an adsorbate, thereby at least partially removing said adsorbate;

wherein said adsorbent material comprises a nanostructured material prepared by:
pyrolyzing a metal complex containing ligands; and
incorporating both carbon and nitrogen in the pores of a porous inorganic material wherein the metal is Ti, V, Cr, Mn, Fe, Co, Ni, Cu, Zn, Ru, Rh, Pd, Ag, Re, Os, Ir, Pt, or Au and the porous inorganic material is a zeolite or mesoporous inorganic material.

11. A composition of matter for adsorption of chemical species from a separate phase or phases, comprising a nanostructured material prepared by:
pyrolyzing a metal complex containing ligands; and
incorporating both carbon and nitrogen in the pores of a porous inorganic material wherein the metal is Ti, V, Cr, Mn, Fe, Co, Ni, Cu, Zn, Ru, Rh, Pd, Ag, Re, Os, Ir, Pt, or Au and the porous inorganic material is a zeolite or mesoporous inorganic material.

12. A method for at least partially removing an adsorbate from a phase, said method comprising:
providing an adsorbent material;
contacting said adsorbent material with said phase having an adsorbate, thereby at least partially removing said adsorbate;
said adsorbent material having the chemical formula $RE_{1-x-y-z}B_xB'_yB''_zO_w$ wherein
RE is a rare earth metal selected from the group consisting of Ce, Pr, Sm, Eu, Tb, Tm, and Yb;
B is a trivalent metal ion selected from the group consisting of Gd, Nd, Dy, Ho, Er, Lu, Sc, Y, La, Bi, Sb, In, Sn, Ga, and Al;
B' is a transition metal ion selected from the group consisting of Ti, Zr, V, Cr, Mn, Fe, Ru, Co, and Ni, or B' is an alkaline earth element selected from the group consisting of Mg, Ca, Sr, and Ba;
B" is a transition metal ion selected from the group consisting of Cu, Ag, and Zn;
$0 \leq x \leq 0.25$; $0 \leq y \leq 0.95$; $0 \leq z \leq 0.75$; w is a number which results in charge balance; and $x+y+z<1$;
wherein said phase is a gas and said adsorbate is selected from the group consisting of hydrogen cyanide, ethylene and mercury.

13. The method of claim 12, wherein said adsorbate is ethylene.

14. The method of claim 12, wherein said adsorbent has the chemical formula:

$$Ce_{1-x-y-z}B_xB'_yB''_zO_w$$

wherein B is a trivalent metal ion selected from the group consisting of Gd, La, Bi, and Sc; and B' is a transition metal ion selected from the group consisting of Ti, Zr, V, Cr, Mn, Fe, Ru, Co, and Ni.

15. The method of claim 12, wherein said adsorbent has the chemical formula:

$$Ce_aLa_bMn_cCu_dO_w,$$

wherein $0.4 \leq a \leq 0.6$; $0.01 \leq b \leq 0.06$; c is $0.20 \leq c \leq 0.40$; $0.05 \leq d \leq 0.30$.

16. The method of claim 12, wherein said adsorbent has the chemical formula:

$$Ce_aLa_bMn_cCu_dO_w,$$

wherein $0.45 \leq a \leq 0.6$, $0.02 \leq b \leq 0.05$, $0.25 \leq c \leq 0.4$, and $0.05 \leq d \leq 0.25$.

* * * * *